March 22, 1966 J. C. NUNN 3,241,217
DESICCATION OF ELECTRONIC ENCLOSURES USING BORON
NITRIDE HOT SEALING METHOD
Filed Nov. 9, 1962
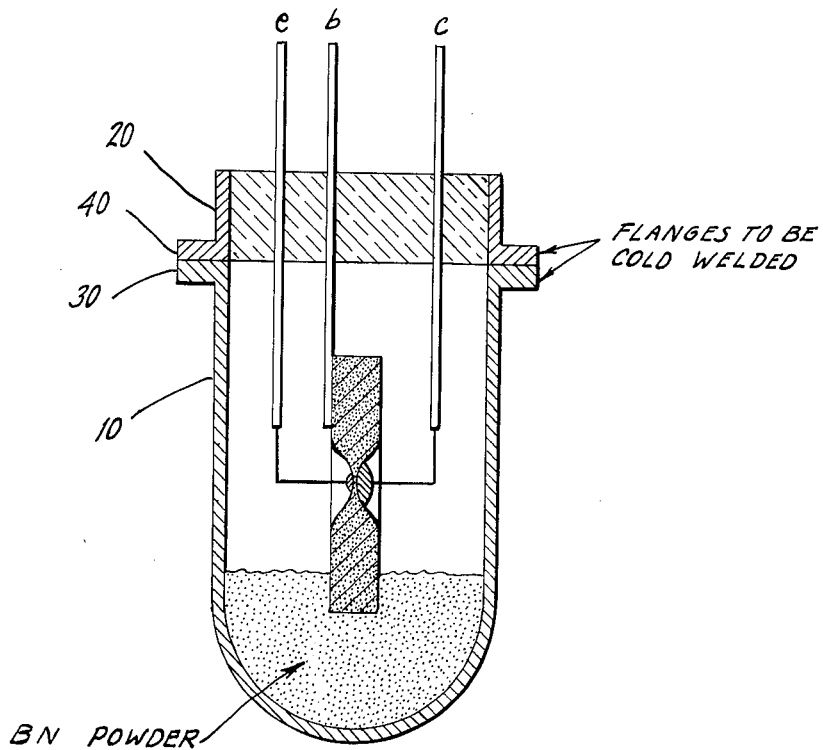
INVENTOR.
JEROME C. NUNN
BY
Robert D. Sanborn
ATTORNEY

United States Patent Office 3,241,217
Patented Mar. 22, 1966

3,241,217
DESICCATION OF ELECTRONIC ENCLOSURES USING BORON NITRIDE HOT SEALING METHOD
Jerome C. Nunn, Spring City, Pa., assignor to Philco Corporation, Philadelphia, Pa., a corporation of Delaware
Filed Nov. 9, 1962, Ser. No. 236,545
7 Claims. (Cl. 29—155.5)

This invention concerns the use of boron nitride (BN) as a desiccant in electronic applications. More particularly it concerns the use of BN powder as a desiccant in cold welded transistor enclosures.

In the copending application of John McBride, filed November 9, 1962, Serial No. 236,562, and entitled, "Electrical Apparatus," the desirability of utilizing BN as a component in potting and reinforcing compounds for electronic devices was discussed. It was found that BN does not degrade transistor surfaces as prior potting compounds did because of their incompatability with certain types of semiconductive materials. I have found that BN may also be advantageously used to desiccate semiconductor enclosures of the variety wherein no potting compound is normally employed.

It has been observed that moisture, even in minute amounts, is extremely deleterious to semiconductive devices. For example Silicon Precision Alloy Transistor (SPAT) choppers which are fabricated in cold welded cans having only five parts per million of moisture content tend to have an undesirably high incidence rate of high offset voltage drift due to such moisture.

It should be parenthetically noted that moisture problems are not encountered with potted semiconductors because of the fact that the potting material will displace the moisture-containing air in the semiconductor can. Potting compounds are mainly used with resistance welded transistor cans to prevent the vapors from the weld flash from reaching the transistor. Because no potting compound is used in cold welded transistor cans, the moisture problem is there evident.

Objects

It is an object of the present invention to overcome the moisture problem found in the fabrication of cold welded semiconductor can assemblies. Another object is to provide a new and improved method of desiccating packaged electronic units.

Summary

According to one specific embodiment of the invention, transistor cans are cold welded with a quantity of boron nitride powder sealed therein according to the hot sealing technique. When the process of the invention is used in conjunction with the SPAT choppers discussed above the yield of stable units rises dramatically to an acceptable value.

Drawing

The single figure of drawing shows a transistor fabricated with a BN powder desiccant according to the invention.

Discussion

The most effective method of utilizing the desiccant properties of BN is the so-called hot sealing technique. The top cap 10 of the device is filled to about ⅓ of its volume with pure BN powder as shown, and baked under vacuum conditions at 190° C. for sixteen hours. The transistor stem assembly 20 is baked in accordance with the transistor schedule, which will typically be 140° C. for one hour. After the top cap 10 and transistor stem assembly 20 are removed from their respective vacuum ovens, they are maintained above room temperature, desirably at 200° C., by placing them on hot plates inside a sealing chamber. The flanges 30 and 40 are cold welded in the chamber while the units are hot. (Cold welding is a process whereby extreme pressure alone is utilized to unite two metal surfaces.)

The dry box in which the cold welding occurs contains a very low moisture content, typically less than five parts per million. It is believed that the BN powder is in substantial moisture equilibrium with the interior of the dry box at approximately 200° C. just before cold welding. Therefore the interior of the encapsulated unit would be expected to have an effective five parts per million water vapor content at 200° C. At any lower temperature the BN will take up more moisture and the equivalent atmosphere will have a lower content. Since transistors are ordinarily operated at junction temperatures less than 100° C. it can be seen that the BN will getter much of the moisture on the interior of the can.

For a further discussion of the desirability of desiccation of transistor devices reference is made to an article by Gnaedinger et al. at page 589 of the Journal of the Electrochemical Society for July 1962.

As discussed in the aforenoted McBride application, the excellent compatability of BN with transistor surfaces (particularly those of the P-type) tends to enhance its properties as a semiconductor desiccant. Also the high thermal conductivity of BN enhances the heat dissipation capabilities of desiccated unit.

The process of the invention has been described and shown with reference to a transistor fabricated in a cold welded can. It will be apparent, however, that the process is not limited thereto and can advantageously be used in conjunction with other semiconductive devices including diodes, 4-or-more electrode devices, semiconductor circuit units, etc., as well as with other electronic device containers requiring a high degree of desiccation. Accordingly the invention is defined only by the appended claims.

I claim:
1. A process for desiccating an enclosure containing an electronic device comprising:
    (a) heating said enclosure and a quantity of boron nitride powder to above room temperature,
    (b) sealing said enclosure with said boron nitride powder therein while both are hot.
2. The process of claim 1 wherein said enclosure is a transistor can.
3. The process of claim 2 wherein said can has a flanged top and a flanged bottom, with sealing being accomplished by cold welding said flanges together.

4. The process of claim 2 wherein said can is substantially ⅓ full of boron nitride powder prior to sealing.

5. A process for fabricating a transistor without ambient moisture comprising:
   (a) heating said transistor, the bottom and top of a can therefor, and a quantity of boron nitride powder to a temperature above room temperature so that the moisture content of the foregoing elements is reduced, and
   (b) sealing said can with said powder and transistor therein while all are hot so that said powder will absorb any remaining moisture in said can upon cooling.

6. The process of claim 5 wherein the top and bottom of said can are each flanged, and sealing thereof is accomplished by cold welding said flanges together.

7. The process of claim 6 wherein the temperature of said elements upon sealing is substantially 200° centigrade.

References Cited by the Examiner
UNITED STATES PATENTS 2,810,873  10/1957  Knott.
2,998,556   8/1961  Pritchard et al. __ 252—194 XR JOHN F. CAMPBELL, *Primary Examiner.*